United States Patent
Schuster

(10) Patent No.: US 8,959,750 B2
(45) Date of Patent: Feb. 24, 2015

(54) METHOD AND APPARATUS FOR COMPLETE MACHINING OF A SHAFT-SHAPED WORKPIECE

(71) Applicant: Markus Schuster, Fuchstal-Leeder (DE)

(72) Inventor: Markus Schuster, Fuchstal-Leeder (DE)

(73) Assignee: Emag Holding GmbH, Salach (DE)

( * ) Notice: Subject to any disclaimer, the term of this patent is extended or adjusted under 35 U.S.C. 154(b) by 300 days.

(21) Appl. No.: 13/678,801

(22) Filed: Nov. 16, 2012

(65) Prior Publication Data
US 2013/0340242 A1 Dec. 26, 2013

(30) Foreign Application Priority Data
Nov. 17, 2011 (DE) .......................... 10 2011 118 747

(51) Int. Cl.
*B23Q 7/00* (2006.01)
*B23Q 39/04* (2006.01)
*B23Q 41/02* (2006.01)
*B23Q 7/04* (2006.01)
*B23B 3/30* (2006.01)
*B23Q 39/00* (2006.01)

(52) U.S. Cl.
CPC .............. *B23Q 39/048* (2013.01); *B23Q 7/045* (2013.01); *B23Q 39/04* (2013.01); *B23B 3/30* (2013.01); *B23Q 2039/008* (2013.01); *B23Q 2039/004* (2013.01)

USPC ................... 29/563; 29/557; 29/559; 29/564; 198/377.07; 198/470.1

(58) Field of Classification Search
CPC ........ B23Q 39/048; B23Q 7/045; B23Q 7/00; B23Q 39/04; B23Q 2039/008; B23Q 2039/004; B23B 3/30
USPC ..................... 29/557, 559, 563, 564; 82/121; 198/377.07, 470.1
See application file for complete search history.

(56) References Cited

U.S. PATENT DOCUMENTS 5,152,201 A * 10/1992 Izawa .............................. 82/1.11
6,904,665 B2   6/2005 Walz
8,844,411 B2 * 9/2014 Schuster .......................... 82/122

* cited by examiner

*Primary Examiner* — Alexander P Taousakis
(74) *Attorney, Agent, or Firm* — Andrew Wilford

(57) ABSTRACT

A machining apparatus has a frame defining an input station, an output station, and first and second machining stations. Respective first and second workpiece holders in the first and second machining stations can retain a workpiece therein. A first pivotal turret is movable vertically and horizontally on the frame between the input station and the first machining station and carries at least one machining tool and a first grab, and a second pivotal turret is movable vertically and horizontally on the frame between the first and second machining stations and the output station and carries at least one machining tool and second and third grabs.

9 Claims, 3 Drawing Sheets

METHOD AND APPARATUS FOR COMPLETE MACHINING OF A SHAFT-SHAPED WORKPIECE

FIELD OF THE INVENTION

The present invention relates to the complete machining of an elongated workpiece. More particularly this invention concerns a method of and apparatus for completely machining a shaft or the like.

BACKGROUND OF THE INVENTION

A machine with a plurality of successive machining stations is known from U.S. Pat. No. 6,904,665. Tool turrets each having a grab are mounted to the left and right of each of two machining stations. The tool turrets are movable so that the machining and the gripping of the workpieces can take place in a machining station by tools and grabs of both tool turrets. Three tool is turrets are required for a machining apparatus operating according to this principle with two machining stations for "complete" machining, meaning not only machining outer surfaces of a rod-shaped workpiece centered on an axis by rotating the workpiece, lathe fashion, while pressing tools—cutting bits, grinding stones, burnishers—against its outer surface but also machining ends of the workpiece, for instance boring an axial hole in the workpiece end. Thus "complete" machining entails both engaging a tool radially with the workpiece while it is rotating about its axis and engaging a tool axially with the workpiece while rotating the tool and holding the workpiece against rotation or rotating the workpiece relative to a nonrotating tool.

OBJECTS OF THE INVENTION

It is therefore an object of the present invention to provide an improved method and apparatus for complete machining a shaft-shaped workpiece.

Another object is the provision of such an improved method and apparatus for complete machining a shaft-shaped workpiece that overcomes the above-given disadvantages, in particular that transports the workpieces efficiently and that reduces idle time during which no machining takes place.

SUMMARY OF THE INVENTION

A machining apparatus has according to the invention a frame defining an input station, an output station, and first and second machining stations. Respective first and second workpiece holders in the first and second machining stations can retain a workpiece therein. A first pivotal turret is movable vertically and horizontally on the frame between the input station and the first machining station and carries at least one machining tool and a first grab, and a second pivotal turret is movable vertically and horizontally on the frame between the first and second machining stations and the output station and carries at least one machining tool and second and third grabs. This apparatus is operated by first taking a semifinished workpiece out of the first machining station with one of the grabs of the second turret and generally simultaneously taking an unfinished workpiece out of the input station with the grab of the first turret. Thereafter the unfinished workpiece is placed in the first station by the grab of the first turret, and a finished workpiece is taken out of the second machining station by the other grab of the second turret. Thereafter the semifinished workpiece is placed in the second machining station by the one grab of the second turret and the finished workpiece is placed in the output station by the other grab of the second turret.

Thus with this system, by providing two grabs on the second turret, it is possible to dispense with a complete turret assembly as provided in the prior art. In fact the semifinished workpiece is held in the one grab of the second turret while the other grab of the second turret takes the finished workpiece out of the second machining station. As this happens of course, the unfinished workpiece can be undergoing a lengthy surface-machining operation.

The second machining station according to the invention has a drive means for rotating the semifinished workpiece about a second axis and the second turret has drive means for acting with one of the tools of the second turret axially on an end of the semifinished workpiece in the second machining station.

Similarly according to the invention the first machining station has drive means for rotating the unfinished workpiece about a first axis and the tools of the first turret are engageable radially of the first axis with the unfinished workpiece while it is rotating in the first machining station.

The machining apparatus further has according to the invention a first vertical guide and a second vertical guide offset therefrom on the frame, a first main carriage and a second main carriage respectively vertically shiftable on the first and second guides, a second horizontal guide and a second guide offset therefrom respectively on the first and second main carriages, and a first secondary carriage and a second secondary carriage respectively vertically shiftable on the first and second horizontal guides. The first secondary carriage carries the first turret and the second secondary carriage carries the second turret.

The first and second turrets are rotatable about respective vertical axes on the respective secondary carriages.

BRIEF DESCRIPTION OF THE DRAWING

The above and other objects, features, and advantages will become more readily apparent from the following description, reference being made to the accompanying drawing in which.

DETAILED DESCRIPTION

Figure 1:
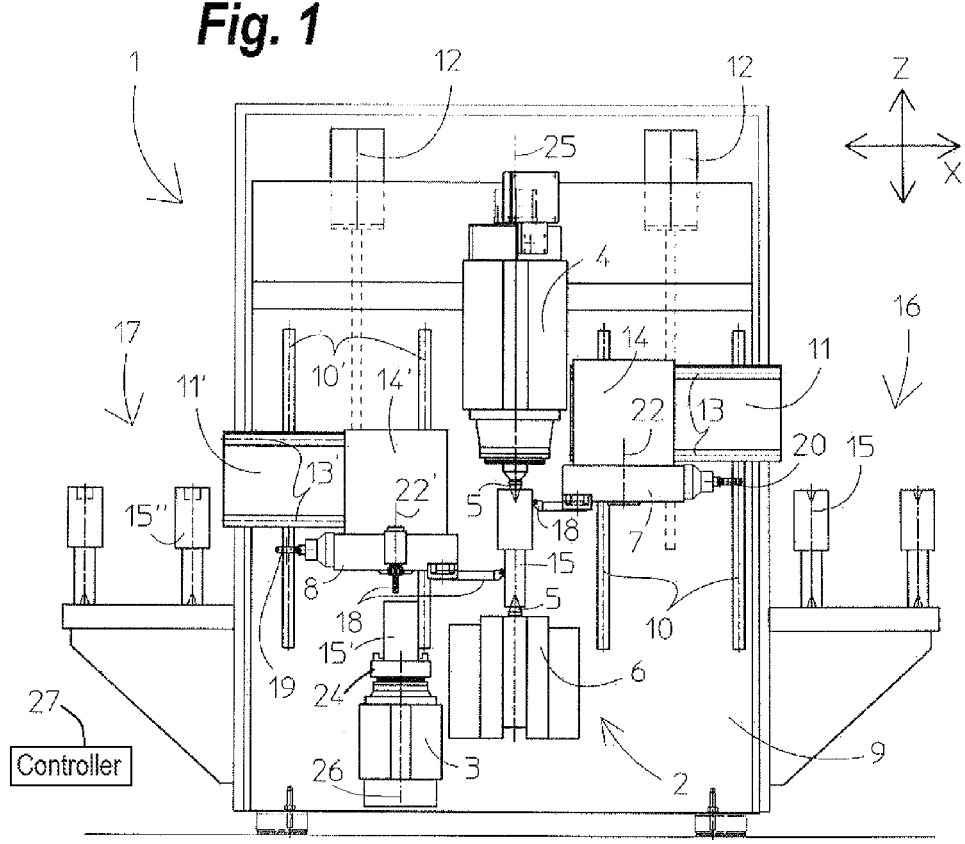
FIG. 1 is a front view of the machining apparatus according to the invention.

As seen in FIG. 1 a machining apparatus 1 for carrying out the method has a rigid frame 9 provided with two machining stations 2 and 3. The station 2 is set up with a driven headstock 4 and tailstock 6 having center points 5 centered on a common vertical axis 25 for rotating a workpiece 15 about a vertical axis while machining its radially outwardly directed surfaces lathe-fashion as will be described below. The station 3 has a single chuck 24 that can grip one end of the workpiece 15 centered on another vertical axis 26 offset from the axis 25 for machining either by rotating the workpiece 15 about the axis 26 while engaging a tool axially with it or rotating a tool about the axis 26 while axially shifting the workpiece and tool together, again as described in greater detail below.

Unfinished workpieces are delivered to the apparatus 1 on one side at an input or loading station 16, typically on a conveyor belt. Finished workpieces 15" are transported away from an output or unloading station 17 on the opposite side of the frame 9, normally by another conveyor belt.

The front wall of the frame 9 is a vertical plane carrying two horizontally offset pairs of guide rails 10 and 10' supporting respective main carriages 11 and 11' movable vertically by respective drive motors 12 and 12'. The main carriages 11 and 11' are in turn provided with respective pairs of vertically spaced guide rails 13 and 13' carrying secondary carriages 14 and 14' in turn carrying respective turrets 7 and 8 rotatable on the carriages 14 and 14' about respective vertical axis 22 and 22'. Unillustrated motors like the drives 12 and 12' are provided for shifting the carriages 14 and 14' on the carriages 11 and 11'.

Figure 1A:
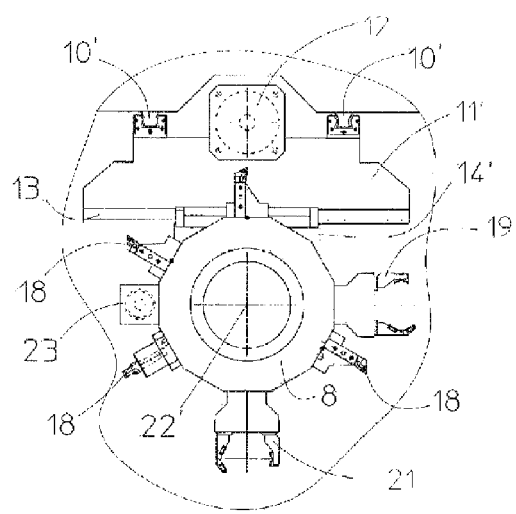
FIG. 1A is a large-scale top view of a tool holder.

Both of the turrets 7 and 8 are provided with an annular array of machining tools 18. The turret 7 also carries at least one grab 20 and as shown in FIG. 1a the turret 8 at least two such grabs 19 and 21. In addition the turret 8 carries an end-machining tool 23, here a drill. The turret 7 can serve to move an unfinished workpiece 15 from the input station 16 to the first machining station 2, and can also press any of its tools 18 against the workpiece 15 while in the station 2 to machine the outer workpiece surfaces while the workpiece is rotated by the headstock 4 about the axis 25. The turret 8 has a more complex function in that it can, for instance, with its grab 19 move a semifinished workpiece 15' from the first machining station 2 to the second machining station 3, and a completely finished workpiece 15" from the second machining station 3 to the output station 17, and also to simply hold a workpiece out of the way with the other grab 21 as will be described below.

Figure 2:
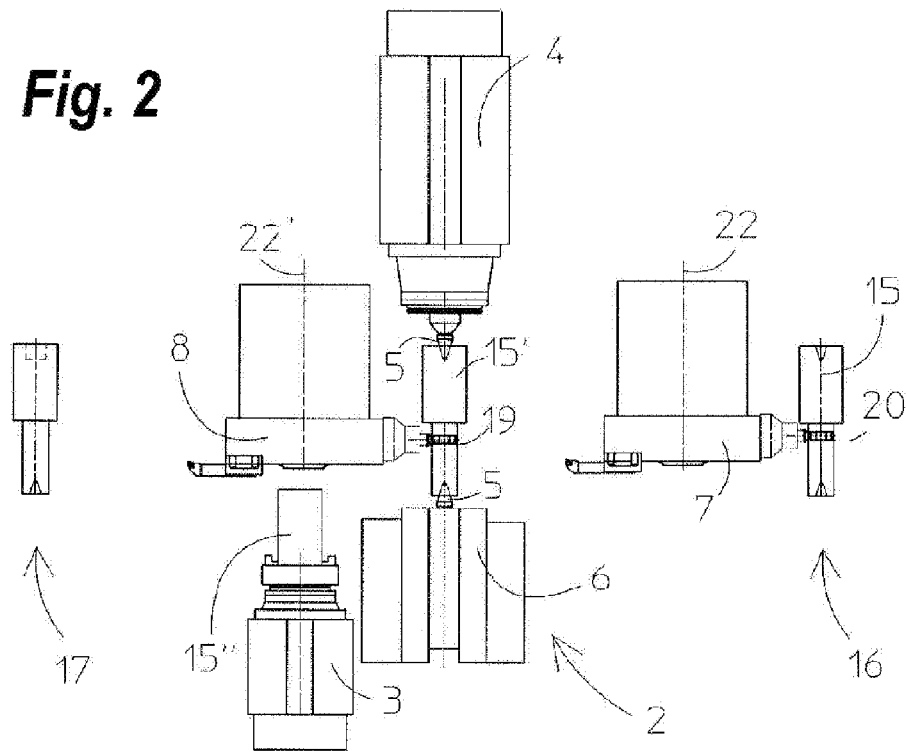
FIG. 2-5 are schematic views illustrating the steps of the invention.

The sequence of movements for complete machining of a single unfinished workpiece 15 is shown in greater detail in FIGS. 2 to 5 and is directed by a controller or control means 27 connected to the drives 12 and 12', the drives for rotating the turrets 7 and 8, for opening and closing the grabs 19, 20 and 21, and for shifting the secondary carriages 14 and 14' on the main carriages 11 and 11', as well as to the drives for the stations 2 and 3. A new cycle begins as shown in FIG. 2 when the first grab 19 on the tool holder 8 grips the semifinished workpiece 15' in the first machining station 2 and simultaneously the second grab 20 on the tool holder 7 grips an unfinished workpiece 15 in the input station 16. Then both tool holders 7, 8 rotate about their pivot axes 22 and 22' and move along the respective horizontal guides 13 and 13'.

Figure 3:
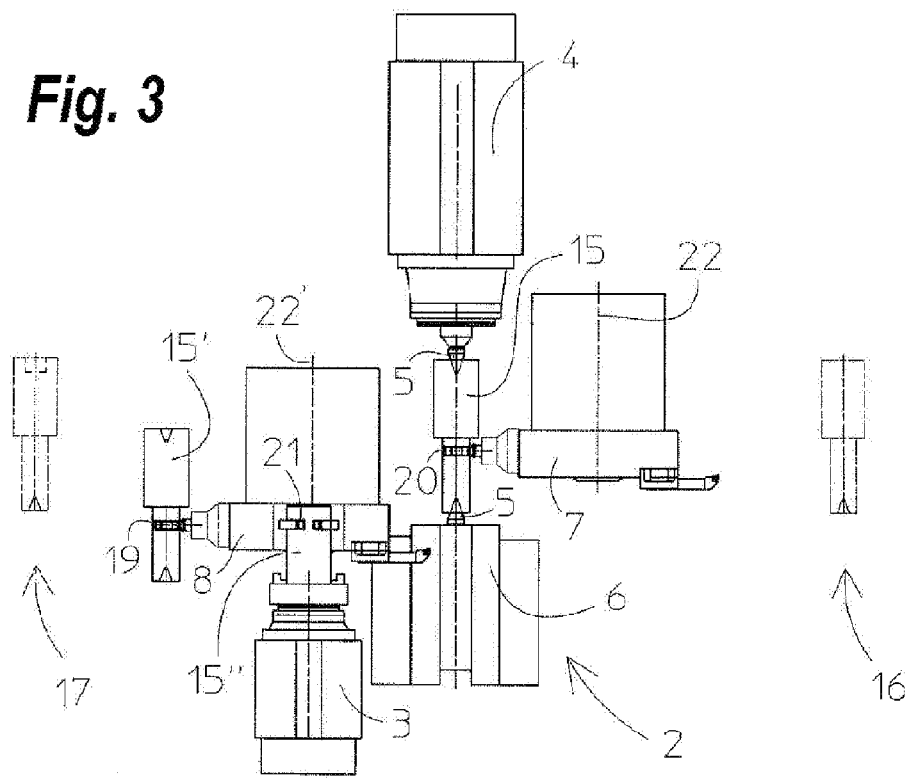
Figure 4:
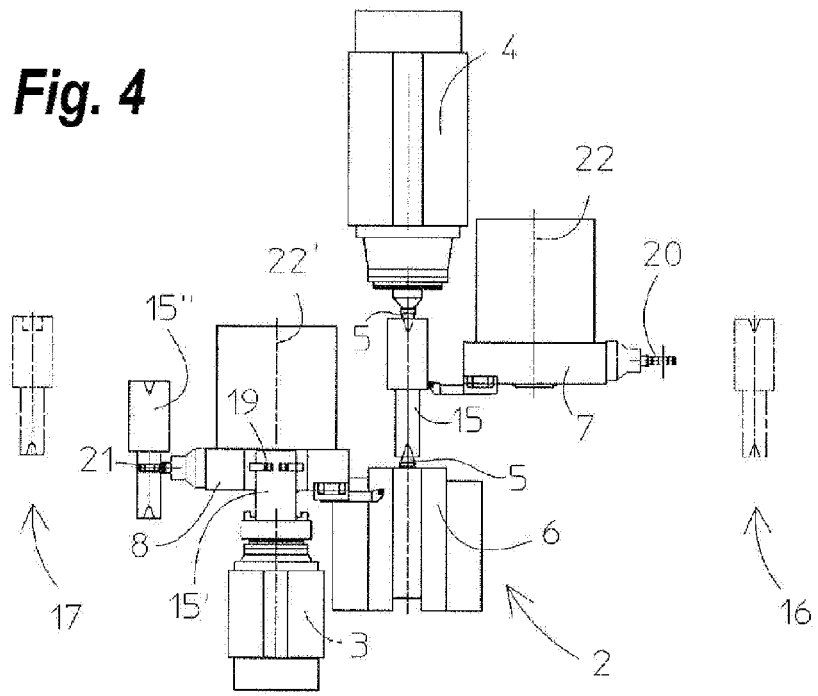

Then as shown in FIG. 3, the unmachined workpiece 15 is clamped in the machining station 2 and can be machined by the tools 18 of the first tool holder 7. At the same time the finished workpiece 15" is removed by the third grab 21 from the second machining station 3.

Then the partially machined workpiece 15' held in the grab 19 of the same holder 8 is set and clamped in the second machining station 3 (FIG. 4) and the finished workpiece 15" is deposited in the output station 17. Then the workpiece 15 is machined in the first machining station 2 on four axes as shown in FIG. 1.

Figure 5:
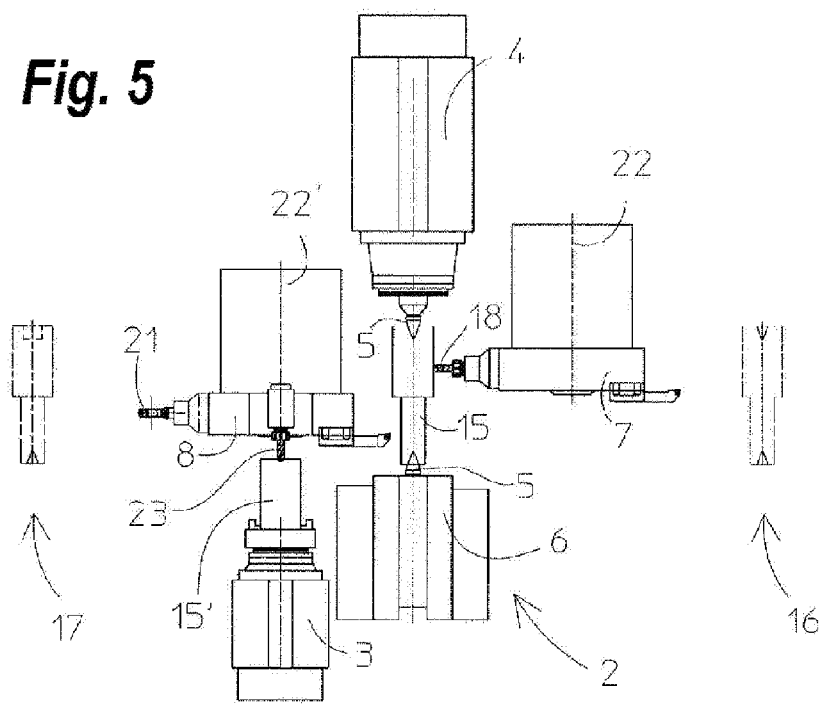

Finally as shown in FIG. 5, the machining cycle is terminated by machining the end face of the workpiece 15' in the second machining station 3. The formation of a bore by the drill 23 is illustrated by way example. Simultaneously, if need be, the workpiece 15 can also be machined in the first machining station 2 by tools 18 of the first tool holder 7.

I claim:

1. A machining apparatus comprising:
   a frame defining an input station, an output station, and first and second machining stations;
   respective first and second workpiece holders in the first and second machining stations capable of retaining a workpiece therein;
   a first pivotal turret movable vertically and horizontally on the frame between the input station and the first machining station and carrying at least one machining tool and a first grab;
   a second pivotal turret movable vertically and horizontally on the frame between the first and second machining stations and the output station and carrying at least one machining tool and second and third grabs; and
   means connected to the turrets for:
      taking a semifinished workpiece out of the first machining station with one of the grabs of the second turret and generally simultaneously taking an unfinished workpiece out of the input station with the grab of the first turret; thereafter
      placing the unfinished workpiece in the first station with the grab of the first turret;
      taking a finished workpiece out of the second machining station with the other grab of the second turret; and thereafter
      placing the semifinished workpiece in the second machining station with the one grab of the second turret; and
      placing the finished workpiece in the output station with the other grab of the second turret.

2. The machining apparatus defined in claim 1, wherein the second machining station has means for rotating the semifinished workpiece about a second axis and the second turret has means for acting with one of the tools of the second turret axially on an end of the semifinished workpiece in the second machining station.

3. The machining apparatus defined in claim 2, wherein the first machining station has means for rotating the unfinished workpiece about a first axis and the tools of the first turret are engageable radially of the first axis with the unfinished workpiece while it is rotating in the first machining station.

4. The machining apparatus defined in claim 1, further comprising
   a first vertical guide and a second vertical guide offset therefrom on the frame;
   a first main carriage and a second main carriage respectively vertically shiftable on the first and second guides;
   a second horizontal guide and a second guide offset therefrom respectively on the first and second main carriages; and
   a first secondary carriage and a second secondary carriage respectively vertically shiftable on the first and second horizontal guides, the first secondary carriage carrying the first turret and the second secondary carriage carrying the second turret.

5. The machining apparatus defined in claim 4 wherein the first and second turrets are rotatable about respective vertical axes on the respective secondary carriages.

6. A method of operating a machining apparatus having:
   a frame defining an input station, an output station, and first and second machining stations;
   respective first and second workpiece holders in the first and second machining stations capable of retaining a workpiece therein;
   a first pivotal turret movable vertically and horizontally on the frame between the input station and the first machining station and carrying at least one machining tool and a first grab; and
   a second pivotal turret movable vertically and horizontally on the frame between the first and second machining stations and the output station and carrying at least one machining tool and second and third grabs, the method comprising the steps of:

taking a semifinished workpiece out of the first machining station with one of the grabs of the second turret and generally simultaneously taking an unfinished workpiece out of the input station with the grab of the first turret; thereafter placing the unfinished workpiece in the first station with the grab of the first turret;

taking a finished workpiece out of the second machining station with the other grab of the second turret; and thereafter placing the semifinished workpiece in the second machining station with the one grab of the second turret; and placing the finished workpiece in the output station with the other grab of the second turret.

7. The method defined in claim 6, further comprising the steps of:

rotating the semifinished workpiece about a second axis in the second machining station and means for acting axially via one of the tools of the second turret on an end of the semifinished workpiece in the second machining station.

8. The method defined in claim 7, further comprising the steps of:

rotating the unfinished workpiece about a first axis in the first machining station and engaging one of the tools of the first turret radially of the first axis with the unfinished workpiece while it is rotating in the first machining station.

9. The method defined in claim 8, wherein the semifinished workpiece is held in the one grab of the second turret while the other grab of the second turret takes the finished workpiece out of the second machining station.

* * * * *